(12) United States Patent
Lin et al.

(10) Patent No.: US 6,434,508 B1
(45) Date of Patent: Aug. 13, 2002

(54) METHOD OF SYNCHRONIZED SURVEY WITH COMPUTER AID

(76) Inventors: Chih-Hsiung Lin; Cheng-Tsan Lai, both of 1F, No.143, Chun Shaug St., Chung Ho City, Taipei Hsien (TW)

(*) Notice: Subject to any disclaimer, the term of this patent is extended or adjusted under 35 U.S.C. 154(b) by 2 days.

(21) Appl. No.: 09/637,366

(22) Filed: Aug. 15, 2000

(30) Foreign Application Priority Data

Aug. 16, 1999 (TW) ........................ 088113984

(51) Int. Cl.⁷ .................... H03K 17/94; G05D 3/00
(52) U.S. Cl. ............... 702/153; 701/50; 172/4.5; 356/3
(58) Field of Search ............... 702/153; 701/50; 172/2, 3, 4.5; 356/3, 248, 138; 700/306; 341/22, 23

(56) References Cited

U.S. PATENT DOCUMENTS 4,902,130 A * 2/1990 Bouillot et al. ............ 356/138
5,815,095 A * 9/1998 Yamamoto ................. 341/22
5,996,702 A * 12/1999 Hall .......................... 172/4.5

* cited by examiner

Primary Examiner—Kamini Shah
(74) Attorney, Agent, or Firm—Troxell Law Office PLLC

(57) ABSTRACT

A method of synchronized survey with computer aid with which a working drawing of engineering is transformed into a drawing file in the computer. The drawing file on the screen accompanying with the window page can appear locations and coordinates of a reference point, a rear view point or all control points specifically. The computer and the theodolite connect with a modem respectively to transmit data related to survey to each other by way of communication network. Place the theodolite at the reference point in the job site and the locating prism at the rear view point or each control point. The screen of display in the computer may appear the location of locating prism in the working drawing on the instant such that the operator of locating prism may be informed to move toward a correct operating point. The present invention offers an innovated way of survey work with figure, synchronization, monitoring and display, and remote control such that the surveyed data can be checked and corrected at any time and a great deal of works can be simplified to lower down tremendous required time, manpower, and cost.

15 Claims, 4 Drawing Sheets

METHOD OF SYNCHRONIZED SURVEY WITH COMPUTER AID

BACKGROUND OF THE INVENTION

1. Field of the Invention

The present invention relates to a method of survey regarding construction and architecture, and particularly to a method of synchronized survey, with which a survey of remote control can be reached by way of computer aid.

2. Description of Related Art

Conventionally, the method of survey used in the field of construction and architecture is conducted by way of an experienced surveyor directs assistant surveyors to perform surveying work in a job site. The surveyors proceed the surveying work in accordance with a great deal of control point numbers and coordinates recorded in a paper report. In order to locate the coordinates of the control points with respect to the reference point correctly, many mathematical operations have to be done for the surveying work. Presently, a calculator or a computer has been utilized for the mathematical operations such that a lot of time is saved and more accurate results can be obtained. Moreover, there is another way has been utilized by way of computer that data related to the point numbers and the coordinates in the paper report is stored in the computer accompanying laser theodolite and locating prism. In this way, an angle and a distance of the respective control points with respect to the reference point can be measured correctly such that it makes the surveying work much easier. However, the present method of survey has to rely on the paper report only, such that a lot of point numbers and coordinates in the paper report have to be figured out by way of instruments in order to carry out the survey. The surveyed data received in the job site is then brought back to the office to proceed the calculation. Although it may reduce the calculating time and errors resulting from calculation, it is very possible that mistaken result may be made because of inappropriate manual operation, inaccurate instruments, or inappropriately displaced control points. As a result, the time of whole day survey and the cost incurred are wasted completely. In addition, once the incorrect points are drafted during construction, it may produce a greater loss. The present invention has overcome the shortcomings existing in the prior art.

SUMMARY OF THE INVENTION

An object of the present invention is to provide a method of synchronized survey with computer aid, with which a working drawing may appear on a screen of the computer directly by way of an interface to monitor and show locations of control points instantaneously so as to find out and correct mistakes easily for assuring a good quality of survey.

Another object of the present invention is to provide a computer aided method of survey by way of communication network and remote control, with which a survey can be carried out under a bad weather and it is possible for multiple groups of survey works being simultaneously proceeded to save manpower and to lower the cost respectively.

BRIEF DESCRIPTION OF THE DRAWINGS

The present invention can be more fully understood by referring to the following description and accompanying drawing, in which.

DETAILED DESCRIPTION OF THE PREFERRED EMBODIMENT

Figure 1:
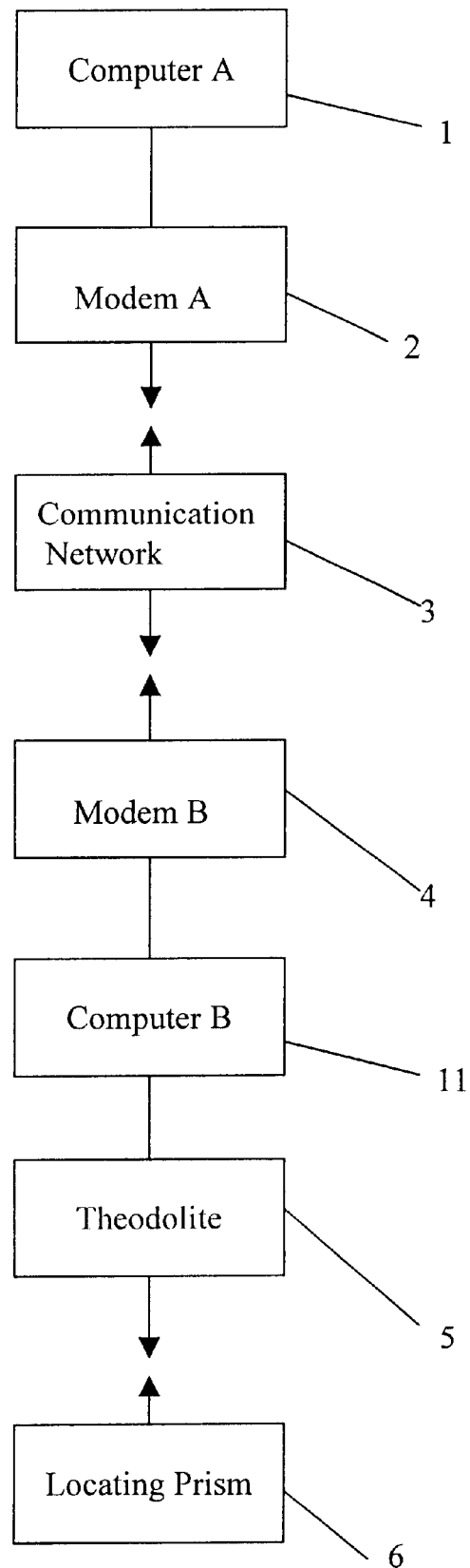
FIG. 1 is a block diagram of hardware applied according to the present invention.

Referring to FIG. 1, the hardware used by the method of synchronized survey with computer aid according to the present invention comprises a computer A1, a modem A2, communication network 3, a modem B4, a computer B11, a theodolite 5, and a locating prism 6. The computer A1 stores programs for operating the method of the present invention and computer files of working drawings. The computer A1 connects with the modem A2 and the modem A2 communicates with modem B4 via the communication network 3. The modem B4 connects with the computer B11 via the theodolite 5 and the theodolite 5 emits laser to be reflected by the locating prism 6. The reflected laser may figure out coordinates of locating prism 6 relative to a reference point and coordinates are transmitted from the modem B4 to the computer A1 via the communication network 3. A display of the computer A1 on a screen thereof may appear a location of the locating prism 6 in the working drawing synchronously. The theodolite 5 utilized in the present invention may connects with the computer A1 directly. or the theodolite 5 and the computer A1 may connect a radio modem for the operation of survey.

Referring to FIGS. 2(a) and 2(b) the steps of the present invention applied to measure the control points as follows:

1. The computer and the theodolite are arranged to transmit messages to each other.

2. Execute programs of synchronized survey in the computer.

3. Open a drawing file of surveyed construction and a working drawing is then appeared on the display such that a reference point and the rear view point can be selected.

4. Place the theodolite at the reference point on the job site and the locating prism on the rear view point.

5. The theodolite calculates the distance between the reference point and rear view point by way of the laser reflected by the locating prism and the calculated data is transmitted to the computer via the communication network.

6. The computer compares the distance stored in the file of working drawing to that calculated by the theodolite and sent the compared data to the computer. If these two distances are different from each other, a check and a revision are required, and if are same, a survey of control points is proceeded.

7. The operator places the locating prism at a control point ready to be surveyed.

8. The computer instantaneously displays the spot of locating prism to set up the control point in the file of working drawing and saves the control point.

The present invention simplifies the conventional paper report having a great deal of point numbers and coordinates as a easily read figure and all the mathematical calculations are executed by way of the computer directly. The reference point and the rear view point are shown on the screen of the computer directly such that a comparison can be simply made to find out any mistake of survey resulting from deviation or personal factor and a revision cab be made promptly. The theodolite may connect with a servomotor to trace the locating prism automatically or be operated manually to trace the locating prism. In the meantime, the data regarding the location of locating, prism relative to the reference point and the rear view point can be sent back to the computer synchronously to appear on the screen of the computer. All the locations of points and lines can be marked on the working drawing and be saved as a file of drawing in the computer.

Figure 3A:
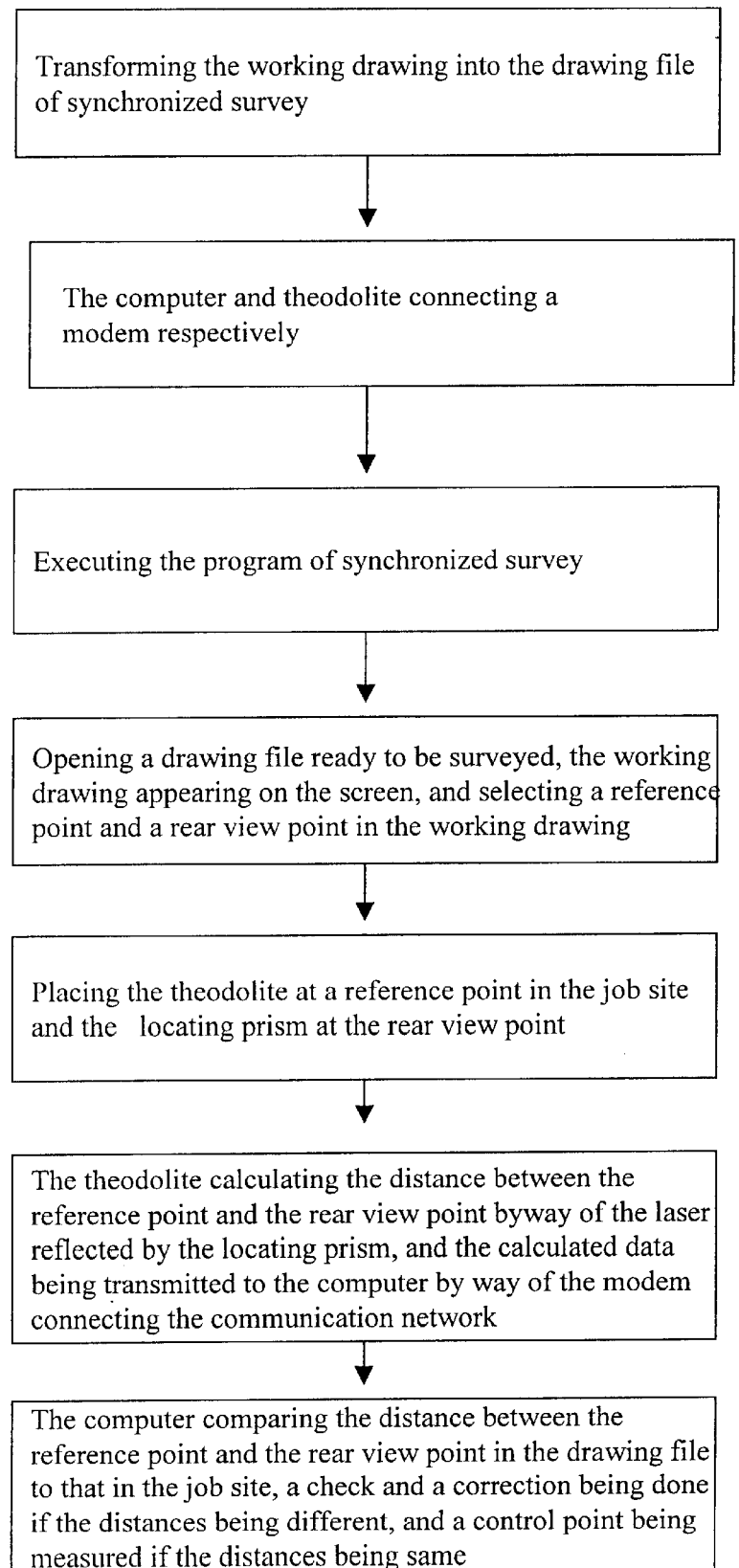
FIG. 3 is another flow chart illustrating steps applied to draft the survey of control points.
Figure 3B:
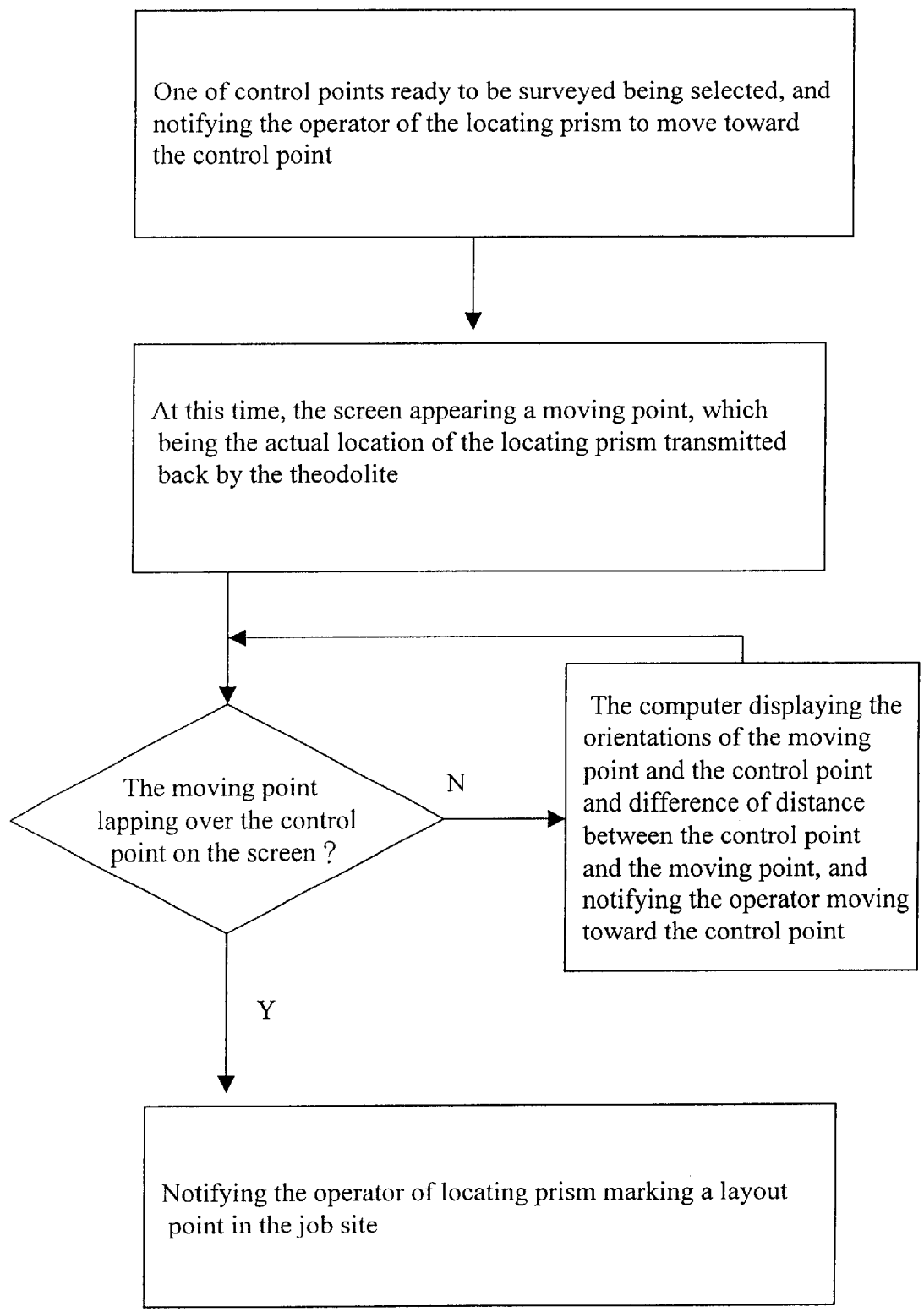

Referring to FIG. 3, the steps of the present invention applied to draft the surveyed control point are as follows:

1. Transform the working drawing into the synchronized surveying file of drawing. in the computer.

2. The computer and the theodolite are arranged to transmit messages to each other.

3. Executing the program of synchronized survey in the computer.

4. Open all the files of drawings ready to be surveyed and the working drawings appear on the screen of the computer so as to be selected the reference point and the rear view point.

5. Place the theodolite at the reference point on the job site and place the locating prism at the rear view point.

6. The theodolite calculates the distance between the reference point and rear view point by way of the reflected laser from the locating prism and the calculated data is transmitted to the computer.

7. The computer compares the distance stored in the file of working drawing to that calculated by the theodolite and sent to the computer; and if these two distances are different, a check and a revision are required and if same, a survey of control points is proceeded.

8. Select a control point to be surveyed and notify the operator for the locating prism to move toward the control point.

9. At this moment, a moving point appears on the screen and the moving point is the actual location of the locating prism in the job site sent back by the theodolite.

10. Based on differences of distance, direction, and height respectively between the moving point and the control point, the operator of locating prism is notified to move toward the control point.

11. When the moving point laps over the control point on the screen of computer, the location of the moving point is the location of layout point.

12. Notify the operator of locating prism marks the layout point in the job site.

The laid out control point in the present invention can appear in the working drawing on the screen of computer directly instead of a lot of point numbers and coordinates being appeared on conventional engineering drawings in the paper report. The present invention can show actual survey drawing to be helpful for the surveyor to understand and make the surveying work easier. Furthermore, the location of locating prism can appear in the working drawing on the screen of the computer synchronously. The difference between the locating prism and the operating point in direction, distance, and height are figured out by the computer immediately to notify the operator of locating prism proceeds the locating work. Also, a prompt comparison to each other can be conducted to check the surveyed data so as to lower down the probability of mistake. The present invention makes the remote controlled survey possible, especially for transnational remote control on internet. The present invention may use communication device such as lines of wires and radio transmitter to connect with the computer and the theodolite such that messages can be communicated in the job site for the surveying work.

An all-station type of theodolite with different brands such as Lecia, Topcon, Geodimeter, and etc. may be adopted in the present invention as a tool of survey. An ordinary drawing drafting software such as AUTO CAD can be used and the working drawings of construction drafted can be transformed into a computer file for proceeding the surveying work. In practice, it is appreciated that the method of synchronized survey with computer aid according to the present invention has been introduced in a synchronized survey system. In addition, it has been proved that the object and the effectiveness of the present invention can be performed completely after a lot of times in tests.

It is noted that a survey can be conducted directly by using the working drawings of construction through the present invention. In this way, it makes the survey be in sight completely such that the required time for reading point numbers and coordinates can be reduced greatly and the probability of mistake in reading the drawings becomes less substantially. The locating prism in the present invention can keep be traced by the computer and appear on the screen of the computer synchronously. The computer can perform prompt calculations, immediate check, and mistake corrections to lower the rate of mistake occurrence and assure the quality of survey. A communication network can be applied to remotely control the operator of locating prism at a far end. A locating point can be adjusted promptly at time of the result being figured by the computer. Furthermore, a computer can be used for surveying multiple groups of job sites.

Figure 2:
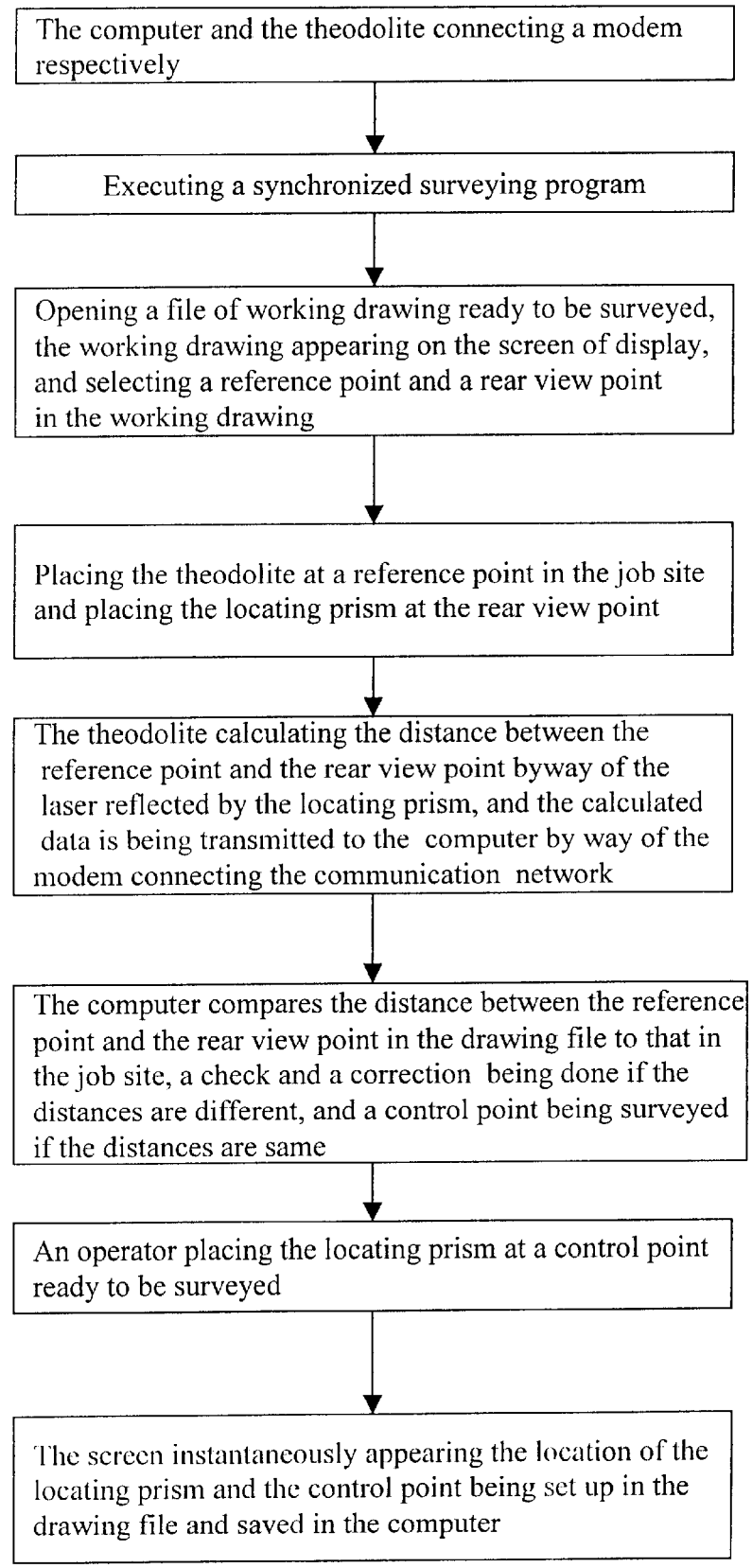
FIGS. 2(a) and 2(b) are flow chart illustrating steps applied to the survey of control points.

The drawing file in the computer has the working drawings and points provided in the working drawings can be adjusted by way of the steps 3 to 6 in FIG. 2 and the steps 4 to 7 in FIG. 3. In this way, the distance between points, orientation and theodolite, and sensitivity of locating prism can be adjusted such that the working drawing of drawing file can correspond to the job site. In practice, a known point adapted with a known orientation or two or more known points instead of the reference point and the rear view point is able to perform the operation of adjustment.

The present invention offers an innovated way of survey work with figure, synchronization, monitoring and display, and remote control such that the surveyed data can be checked and corrected at any time instead of the traditional way of calculating in, recording out, and arranging in. Thus, a great deal of works can be simplified so as to lower down tremendous required time, manpower, and cost.

While the invention has been described with reference to preferred embodiments thereof, it is to be understood that modifications or variations may be easily made without departing from the spirit of this invention, which is defined by the appended claims.

What is claimed is:

1. A method of synchronized survey with computer aid, comprising the following steps:
   (1) arranging a computer communicating with a theodolite;
   (2) executing a program of synchronized survey;
   (3) opening a file of working drawing in the computer, the working drawing then appearing on a screen of display in the computer, selecting known points from the working drawing, adjusting the theodolite and a locating prism at locations in a job site corresponding the known points;
   (4) selecting one of control points being prospectively surveyed in the working drawing on the screen and notifying an operator of the locating prism in the job site to move toward the control point;

(5) a moving point being synchronously monitored and appearing on the screen at the same time, and said moving point being the actual location of the locating prism in the job site transmitted back the computer by the theodolite;

(6) notifying the operator of locating prism to move toward the control point based on a distance and a difference of orientation respectively between the moving point and the control point being shown on the screen and the screen;

(7) at the time of the moving point lapping over the control point shown on the screen, the location of the moving point being a location of layout point; and (8) notifying the operator of locating prism to mark a location of layout point in the job site.

2. The method of synchronized survey with computer aid according to claim 1, wherein an actual working drawing is transformed a file of synchronized survey drawing prior the step (1).

3. The method of synchronized survey with computer aid according to claim 2, wherein one of the computers connects with one of the modems, the other one of the computers connects with the theodolite and the other one of the modems respectively, and the modems are communicate with each other by way of communication network.

4. The method of synchronized survey with computer aid according to claim 2, wherein the computer and the theodolite communicate with each other through the radio transmission.

5. The method of synchronized survey with computer aid according to claim 2, wherein the computer and the theodolite communicate with each other by way of banks of wires.

6. The method of synchronized survey with computer aid according to claim 2, wherein the computer communicates with multiple theodolites.

7. The method of synchronized survey with computer aid according to claim 2, wherein the adjustment in step (3) further comprises the following steps:

selecting a reference point and a rear view point in the working drawing;

placing the theodolite at the reference point and the locating prism at the rear view point;

the theodolite calculating the distance between the reference point and the rear view point by way of a reflected laser from the locating prism and sending the data to the computer; and the computer comparing the distance between the reference point and the rear view point on the working drawing in the file of drawing to the distance in the job site, a check and a correction being required if both the distances are different, and a survey of control point being proceeded if both the distances are same.

8. The method of synchronized survey with computer aid according to claim 3, wherein the communication network is internet for a survey of remote control.

9. A method of synchronized survey with computer aid, comprising the following steps:

(1) arranging a computer communicating with a theodolite;

(2) executing a program of synchronized survey;

(3) opening a file of working drawing in the computer, the working drawing then appearing on a screen of display in the computer, selecting known points from the working drawing, adjusting the theodolite and a locating prism at locations in a job site corresponding the known points;

(4) an operator of locating prism placing the locating prism at a control point going to be surveyed;

(5) the screen appearing the location of locating prism on the instant and setting up the control point in the file of drawing so as to be saved in the computer.

10. The method of synchronized survey with computer aid according to claim 9, wherein one of the computers connects with one of the modems, the other one of the computers connects with the theodolite and the other one of the modems respectively, and the modems are communicate with each other by way of communication network.

11. The method of synchronized survey with computer aid according to claim 9, wherein the computer and the theodolite communicate with each other through the radio transmission.

12. The method of synchronized survey with computer aid according to claim 9, wherein the computer and the theodolite communicate with each other by way of banks of wires.

13. The method of synchronized survey with computer aid according to claim 9, wherein the computer communicates with multiple theodolites.

14. The method of synchronized survey with computer aid according to claim 9, wherein the adjustment in step (3) further comprises the following steps:

selecting a reference point and a rear view point in the working drawing;

placing the theodolite at the reference point and the locating prism at the rear view point;

the theodolite calculating the distance between the reference point and the rear view point by way of a reflected laser from the locating prism and sending the data to the computer; and the computer comparing the distance between the reference point and the rear view point on the working drawing in the file of drawing to the distance in the job site, a check and a correction being required if both the distances are different, and a survey of control point being proceeded if both the distances are same.

15. The method of synchronized survey with computer aid according to claim 10, wherein the communication network is internet for a survey of remote control.

* * * * *